(12) United States Patent
Jiang et al.

(10) Patent No.: US 9,160,620 B2
(45) Date of Patent: Oct. 13, 2015

(54) INTEGRATED FAULT DIAGNOSIS AND PROGNOSIS FOR IN-VEHICLE COMMUNICATIONS

(75) Inventors: Shengbing Jiang, Rochester Hills, MI (US); Mutasim A. Salman, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 501 days.

(21) Appl. No.: 13/307,249

(22) Filed: Nov. 30, 2011

(65) Prior Publication Data

US 2013/0136007 A1  May 30, 2013

(51) Int. Cl.
*H04L 12/24* (2006.01)
*H04L 12/417* (2006.01)

(52) U.S. Cl.
CPC .......... *H04L 41/0677* (2013.01); *H04L 12/417* (2013.01)

(58) Field of Classification Search
CPC ......... H04W 24/00; H04W 8/22; H04W 8/24; H04W 24/08; H04L 43/10; H04L 43/0876; H04B 2001/082; H04B 7/0417; H04B 7/0456; H04B 17/00
See application file for complete search history.

(56) References Cited

U.S. PATENT DOCUMENTS

| | | | |
|---|---|---|---|
| 6,330,499 B1 * | 12/2001 | Chou et al. | 701/31.4 |
| 6,609,051 B2 * | 8/2003 | Fiechter et al. | 701/29.3 |
| 6,654,910 B1 * | 11/2003 | Eibach et al. | 714/37 |
| 6,775,642 B2 * | 8/2004 | Remboski et al. | 702/185 |
| 6,909,398 B2 * | 6/2005 | Knockeart et al. | 342/357.31 |
| 6,947,816 B2 * | 9/2005 | Chen | 701/33.5 |
| 7,023,332 B2 * | 4/2006 | Saito et al. | 340/438 |
| 7,027,685 B2 * | 4/2006 | Harres | 385/24 |
| 7,817,654 B2 * | 10/2010 | Augustin et al. | 370/412 |

(Continued)

FOREIGN PATENT DOCUMENTS

| | | |
|---|---|---|
| CN | 1813226 | 8/2006 |
| JP | 2009302783 A | 12/2009 |
| WO | WO2010144900 A1 | 12/2010 |

OTHER PUBLICATIONS

Yilu Zhang; Salman, M.; Subramania, H.S.; Edwards, R.; Correia, J.; Gantt, G.W.; Rychlinksi, M.; Stanford, J., "Remote vehicle state of health monitoring and its application to vehicle no-start prediction," AUTOTESTCON, 2009 IEEE, vol., no., pp. 88,93, Sep. 14-17, 2009, doi: 10.1109/AUTEST.2009.5314011.*

(Continued)

*Primary Examiner* — Andrew Lai
*Assistant Examiner* — Hoyet H Andrews

(57) ABSTRACT

A method of diagnosing a fault in an in-vehicle communication system. The in-vehicle communication system includes a transmitting node, at least one receiving node, and a network communication bus coupling the transmitting node to the at least one receiving node. A message is transmitted from the transmitting node to the at least one receiving node over the communication bus. A fault detection technique is applied within the transmitting node for detecting a fault within the transmitting node. A fault detection technique is applied to the at least one receiving node for detecting a fault within the at least one receiving node. A fault detection technique is applied within the network communication bus for detecting a fault within the communication bus. An analyzer collectively analyzes results from each respective detection technique for isolating a fault within the in-vehicle communication system.

20 Claims, 2 Drawing Sheets

(56) References Cited

U.S. PATENT DOCUMENTS

| | | | |
|---|---|---|---|
| 8,213,321 B2* | 7/2012 | Butts et al. | 370/251 |
| 8,428,813 B2* | 4/2013 | Gilbert | 701/31.4 |
| 2001/0002449 A1* | 5/2001 | Eisenmann et al. | 701/1 |
| 2007/0032916 A1* | 2/2007 | Mark | 701/1 |
| 2007/0076593 A1 | 4/2007 | Sakurai et al. | |
| 2007/0260911 A1* | 11/2007 | Marilly et al. | 714/4 |
| 2007/0271551 A1* | 11/2007 | Zurawka et al. | 717/120 |
| 2008/0186870 A1* | 8/2008 | Butts et al. | 370/252 |
| 2008/0306647 A1 | 12/2008 | Jeon et al. | |
| 2009/0183033 A1 | 7/2009 | Ando | |
| 2009/0252045 A1 | 10/2009 | Noguchi | |
| 2009/0295559 A1* | 12/2009 | Howell et al. | 340/459 |
| 2009/0299568 A1* | 12/2009 | Schlingmann et al. | 701/35 |
| 2010/0268980 A1 | 10/2010 | Watanabe | |
| 2010/0287563 A1* | 11/2010 | Kishita | 719/313 |

OTHER PUBLICATIONS

Jee-Hun Park; Man-Ho Kim; Suk Lee; Kyung-Chang Lee, "Implementation of a CAN system with dual communication channel to enhance the network capacity," IECON 2010—36th Annual Conference on IEEE Industrial Electronics Society , vol., no., pp. 3.135,3140, Nov. 7-10, 2010, doi:10.1109/IECON.2010.5675026.*

Yilu Zhang; Selman, M.; Subramania, H.S.; Edwards, R.; Correia, J.; Gantt, G.W.; Rychlinksi, M.; Stanford, J., "Remote vehicle state of health monitoring and its application to vehicle no-start prediction," AUTOTESTCON, 2009 IEEE , vol., no., pp. 88,93, Sep. 14-17, 2009, doi: 10.1109/AUTEST.2009.5314011.*

Di Natale, Marco; (Di Natale), titled "Understanding and using the Controller Area network", (Di Natale hereinafter) inst. eecs. berkeley. edu/~ee249/fa08/Lectures/handout_canbus2. pdf (2008), pp. 01 to 47, Oct. 30, 2008.*

CiA Technical Committee, titled CAN Specification 2.0, Part A, published on Nov. 26, 2002, and available from the CiA nonprofit organization at www.can-cia.org/index.php?id=downloads-other-specs.*

Jittiwut Suwatthikul (2010). Fault detection and diagnosis for in-vehicle networks, Fault Detection, Wei Zhang (Ed.), ISBN: 978-953-307-037-7, InTech, Published online Mar. 1, 2010 and available at http://www.intechopen.com/books/faultdetection/fault-detection-and-diagnosis-for-in-vehicle-networks.*

CiA Technical Committee, (CiA et al.), titled "CAN Specification 2.0, Part A, Part B and Addendum"; (CiA hereinafter), published as 3 separate documents on Nov. 26, 2002, and available from the CiA nonprofit organization at www.can-cia.org/index.php?id=downloads-other-specs.*

CiA Technical Committee, (CiA et al.), titled CAN Specification 2.0, Part B published on Nov. 26, 2002, and available from the CiA nonprofit organization at www.can-cia.org/index.php?id=downloads-other-specs.*

CiA Technical Committee, (CiA et al.), titled "CAN Specification 2.0, Addendum", published on Nov. 26, 2002, and available from the CiA nonprofit organization at www.can-cia.org/index.php?id=downloads-other-specs.*

Ly, C.; Tom, K.; Byington, C.S.; Patrick, R.; Vachtsevanos, G.J., "Fault diagnosis and failure prognosis for engineering systems: A global perspective," Automation Science and Engineering, 2009. Case 2009. IEEE International Conference on , vol., no., pp. 108,115, Aug. 22-25, 2009, doi: 10.1109/COASE.2009.5234094.*

Yilu Zhang; Salman, M.; Subramania, H.S.; Edwards, R.; Correia, J.; Gantt, G.W.; Rychlinksi, M.; Stanford, J., "Remote vehicle state of health monitoring and its application to vehicle no-start prediction," Autotestcon, 2009 IEEE , vol., no., pp. 88,93, Sep. 14-17, 2009, doi: 0.1109/AUTEST.2009.5314011.*

Jee-Hun Park; Man-Ho Kim; Suk Lee; Kyung-Chang Lee, "Implementation of a CAN system with dual communication channel to enhance the network capacity," IECON 2010—36th Annual Conference on IEEE Industrial Electronics Society , vol., no., pp. 3135,3140, Nov. 7-10, 2010, doi: 10.1109/IECON.2010.5675026.*

Di Natale, titled "Understanding and using the Controller Area network", inst. eecs. berkeley. edu/~ee249/fa08/Lectures/handout_canbus2. pdf (2008), pp. 01 to 47, Oct. 30, 2008.*

Suwatthikul et al., titled, "Fault detection and diagnosis for in-vehicle networks, Fault Detection", Wei Zhang (Ed.), ISBN: 978-953-307-037-7, InTech, Published online Mar. 1, 2010.*

Suwatthikul et al., "Automotive Network Diagnostic Systems", 1-4244-0777-X/06, © 2006 IEEE.

Suwatthikul et al., "In-Vehicle Network Level Fault Diagnostics Using Fuzzy Inference Systems", Elsevier B.V., doi:10.1016/j.asoc.2011.02.001.

* cited by examiner

INTEGRATED FAULT DIAGNOSIS AND PROGNOSIS FOR IN-VEHICLE COMMUNICATIONS

BACKGROUND OF INVENTION

An embodiment relates generally to in-vehicle communication diagnostics.

A controller-area network (CAN) is a vehicle multiplex bus standard intended to allow electronic control units (ECUs) and other devices to communicate with one another without a central or host controller of the bus. Vehicle systems and subsystems have numerous ECUs that control actuators or receive vehicle operation data from sensing devices.

CAN systems are asynchronous broadcast serial buses which communicate messages serially. Only a single message is communicated on a communication-bus at a time. When a message is ready to be transmitted onto the communication bus, the CAN-controller controls the message transfer on the bus. Since messages are transmitted serially, various nodes on the communication bus await a time to transmit. When a message is ready to be transmitted onto the communication bus, the bus controller controls the message transfer on the bus. If more than one message transmission is initiated simultaneously by multiple transmitters, the more dominant message is transmitted. This is known as an arbitration process. A message with a highest priority will dominate the arbitration and a message transmitting at the lower priority will sense this and wait. Therefore, it is pertinent to maintain a duty cycle for transmitting messages so that a backlog does not occur.

An error in the in-vehicle communication system is detected by the receiver based on a time-out occurring. That is, since messages are transmitted based on a duty cycle (e.g., 10 msec), if a receiver does not receive a message at the allocated time, then an assumption may be made that an error has occurred within the system. The error may occur at the transmitting node or in the communication bus; however, there is no effective method for identifying where the fault exactly occurred in the conventional in-vehicle communication system utilizing the time-out technique.

SUMMARY OF INVENTION

An advantage of an embodiment is an identification of an isolated fault within an in-vehicle communication system utilizing node level diagnostics and network level diagnostics. The system individually analyzes communication layers in each ECU of a CAN system. After each communication layer is analyzed and potential faults are detected, each of the diagnostic results for the communication layers of ECU are collectively analyzed for further isolating the fault. In addition, fault detection is performed on a communication bus for identifying a potential fault within the communication bus. An integrated network level diagnostic analysis is performed on integrated diagnostic data obtained at the ECU level node and the network level diagnostic data for collectively isolating the fault within the in-vehicle communication system.

An embodiment contemplates a method of diagnosing a fault in an in-vehicle communication system, the in-vehicle communication system including a transmitting node, at least one receiving node, and a network communication bus coupling the transmitting node to the at least one receiving node. Each of the transmitting node and the at least one receiving node including a plurality of communication layers for servicing messages within each of the nodes within the in-vehicle communication system. The plurality of communication layers of each node including at least an application layer, an interaction layer, a data link layer, and a physical layer. A message is transmitted from the transmitting node to the at least one receiving node over the communication bus. A fault detection technique is applied within the transmitting node for detecting a fault within the transmitting node. A fault detection technique is applied to the at least one receiving node for detecting a fault within the at least one receiving node. A fault detection technique is applied within the network communication bus for detecting a fault within the communication bus. An analyzer collectively analyzes results from each respective detection technique for isolating a fault within the in-vehicle communication system.

DETAILED DESCRIPTION

Figure 1:
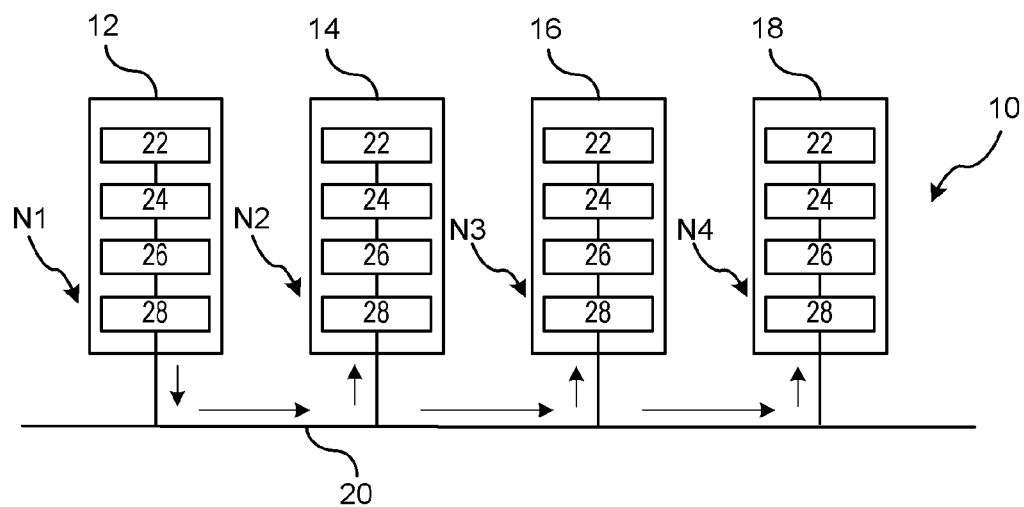
FIG. 1 is an exemplary schematic of a block diagram of a controller area network communication system.

There is shown in FIG. 1, a controller area network (CAN) system 10. The CAN system 10 includes a plurality of electronic control units (ECUs) 12-18 coupled to a communication bus 20 which allows the ECUs to communicate with one another. Each of the plurality of ECUs 12-18 are coupled to one or more sensors, actuators, or control devices (e.g., application components). The application components are not directly connected to the communication bus 20, but are coupled through the respective ECUs. The application components could also be software components in ECUs. A single control feature may span across multiple application components and involve control messages from source to a destination ECU via one or more intermediate processing/control ECUs attached to the same communication bus. For the purposes of this invention, it is understood that CAN systems are known in the art and that ECUs, application devices, CAN controllers, and transceivers are referred to as nodes and the details of their composition will not be discussed in detail herein.

In FIG. 1, messages are serially communicated over the communication bus 20 to each ECU 12-18 as shown. That is, only a single message may be transmitted over the communication bus 20 at one instance of time. For example, in FIG. 1, node N1 transmits a message on the communication bus 20 and is received by nodes N2, N3, and N4. Each of the nodes N2, N3, and N4 receives and processes the message transmitted by the node N1. Each message communicated serially over the communication bus is transmitted on a periodic basis (e.g. 10 msec). As a result, a respective node expects to receive a message substantially every 10 msec.

Each of the electronic control units (ECUs) within each node includes a plurality of communication layers for servicing messages that are received from other nodes or are being prepared for transmission to other nodes. The plurality of communication layers for each ECU includes an application layer 22, an interaction layer 24, a data link layer 26, and a physical layer 28. Each of the plurality of layers provides a function for servicing the message.

The application layer 22 interacts with a respective software application for implementing a communicating device. The application layer 22 identifies a communication entity for determining its identity; for determining resource availability that includes determining whether a network for communication exists; and for synchronizing communications between the applications that require cooperative communications.

The interaction layer 24 attaches the signal from the application layer into a frame that is passed on to the data link layer 26.

The data link layer 26 provides both functional and procedural processes, protocols, and specifications to transfer data between respective ECUs within the in-vehicle communication network.

The physical layer 28 sets forth the electrical and physical hardware and specifications for the communicating devices. The physical layer defines the mode of transmission (e.g., optic, copper), connector type, connector shape, electrical pin configuration, voltages, cable specifications, network adapters, and bus adapters.

Each node N1, N2, N3, and N4 will include a set of communication layers for servicing a message received by another node or a message for transmission by the node itself.

Faults may occur at any point within the CAN system 10 including the ECUs, connections, or the communication bus. Such faults may include hardware faults, including but not limited to, a controller, connector, transceiver, wires, and software. Therefore, fault diagnostic techniques are executed at an ECU node level and at a network level.

Figure 2:
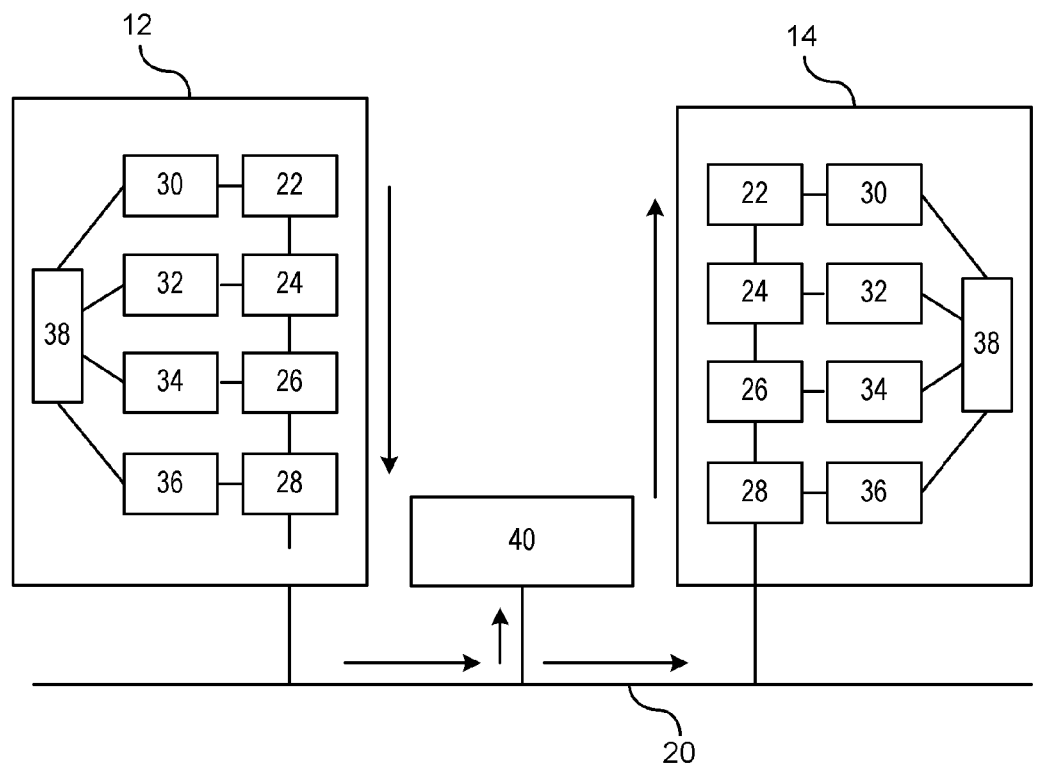
FIG. 2 is a block diagram of the integrated fault analysis detection system.

FIG. 2 illustrates the fault detection analysis performed on both the ECU node level and the network level. The first ECU 12 communicates messages with the second ECU 14 via the communication bus 20. The first ECU 12 is part of the transmitting node and the second ECU 14 is part of the receiving node.

For ECU node level diagnosis and prognosis, fault detection analysis will be performed on each communication layer independently for detecting a fault. For example, a first fault detection technique 30 is performed on the application layer 22, a second diagnostic technique 32 is performed on interaction layer 24, a third diagnostic technique 34 is performed on the data link layer 26, and a fourth diagnostic technique 36 is performed on the physical layer 28.

Diagnostic techniques that may be performed on the physical layer 28 include, but are not limited to, time-domain reflectometry (TDR), frequency-domain reflectometry (FDR), spread-spectrum (TDR), noise-domain reflectometry (NDR), open/short circuit, fault location, and time of occurrence.

Diagnostic techniques that may be performed on the data link layer 26 include, but are not limited to, cyclic redundancy checks (CDC), acknowledgement, bit-stuffing, faulty message ID, and time of occurrence.

Diagnostic techniques that may be performed on the interaction layer and application layer include, but are not limited to, time-out, sequence number, CRC, delay, out of order.

Each respective layer reports its detections to an ECU node level diagnostic module 38 for node level integrated diagnostics. ECU 12 and ECU 14 each include an ECU node level diagnostic module 38 that collects and manages the node level multi-layer diagnostic data. Each ECU node level diagnostic module 38 performs diagnostics on the communication layer data and isolates any sender, receiver, or bus faults within the ECU. For example, a time-out diagnostic technique is performed on the application layer which indicates that information has not been received in the allocated time frame. Typically, a length of time for a time-out includes the expected duration of time between message transmissions. The diagnostic data from each of the communication layers are then provided to the ECU node level module 38 so that each of the diagnostic results from the communication layers can be analyzed collectively. Performing analysis at an integrated node level assists in isolating the fault. That is, fault detection at the communication layer may identify that a fault exists in the in-vehicle communication system, but does not necessarily identify exactly where the fault exist. Performing integrated analysis collectively on the diagnostic data of the communication layers within a respective ECU further assists in isolating the fault.

After each of the ECUs perform node level integrated diagnostic analysis, the diagnostic analysis data from each of the ECUs is transmitted to a network level diagnostic analyzer 40 for integrated network analysis. The network level diagnostic analyzer 40 represents a centralized node for collecting all other diagnostic results of all the ECUs within the in-vehicle communication system and performing the network level integrated analysis. Alternatively, a distributed technique may be used where there is no centralized dedicated node for the performing network level analysis. In the distributed technique, the network level diagnostic analyzer includes a plurality of ECUs are involved in performing the network level integrated analysis through back-and-forth communications among ECUs until a consensus is achieved among the communicating ECUs.

In utilizing the centralized node, the network level diagnostic analyzer 40 collects and manages the diagnostic data from the in-vehicle communication system collectively. The network level diagnostic analyzer 40 performs network level diagnostics which includes the diagnostics of the communication bus 20 and of the nodes coupled to the communication bus. The network level diagnostic analyzer 40 collects the node level diagnostic data from each of the ECUs and also the network diagnostics performed on the communication bus for collectively performing integrated network level diagnostics for further isolating the fault. The fault detection at the network level may indicate whether the fault is isolated to the communication bus or whether the faults is isolated to a coupling between the communication bus and the transmitting node or receiving node.

Prognosis may also be performed at the communication layer level, integrated ECU level, and integrated network level. Integrated prognosis performed at the network level may be used after fault isolation is detected for estimating intermittent faults.

Figure 3:
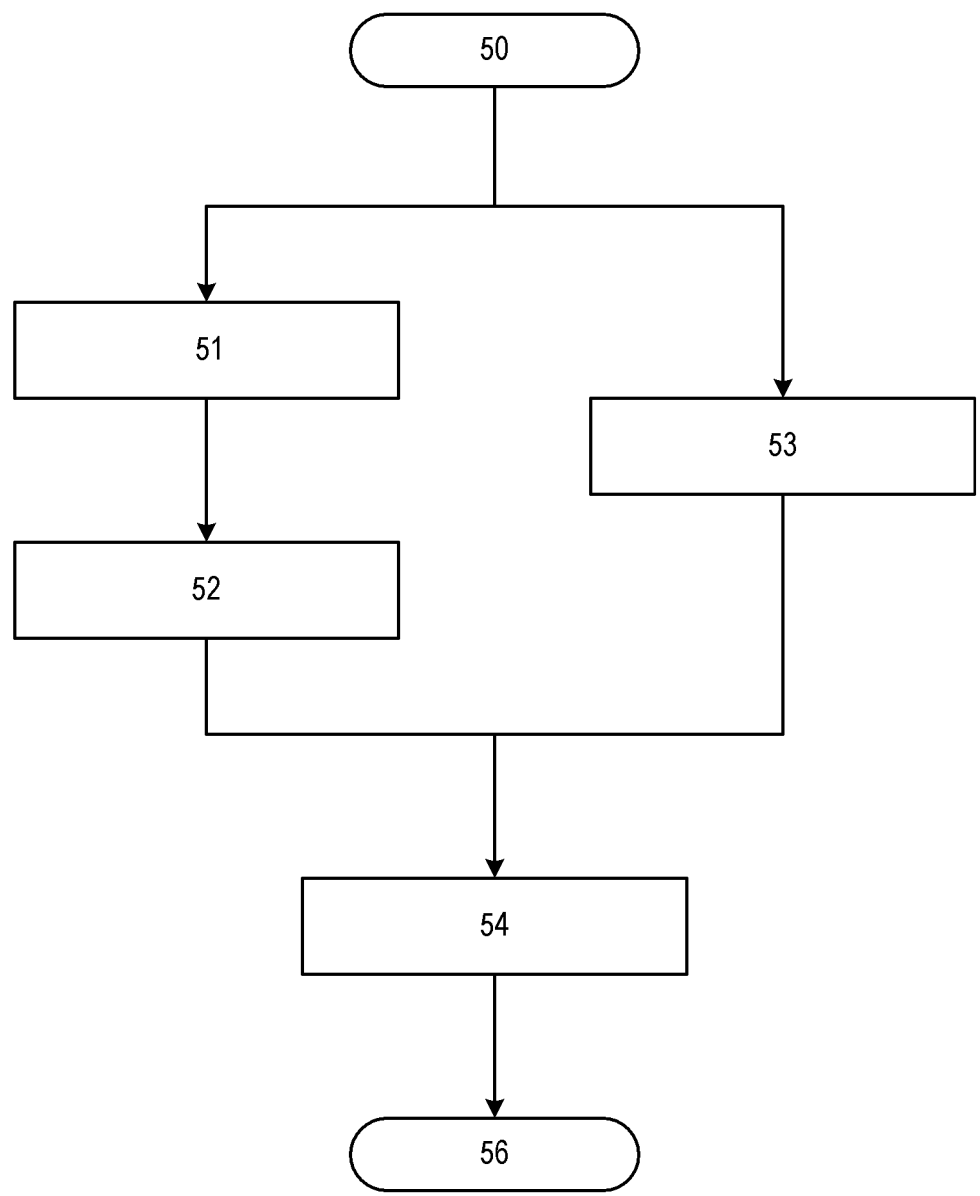
FIG. 3 is a flow diagram for performing integrated diagnostic and prognosis analysis for the in-vehicle communication system

FIG. 3 illustrates a flow diagram for performing integrated diagnostic and prognosis analysis for the in-vehicle communication system. In step 50, the routine is initiated. Diagnostic analysis is performed at both the ECU node level and the network level.

In step 51, fault detection analysis is performed at each respective communication layer for each ECU being analyzed. The fault detection for each communication layer at the node level is analyzed independently of the other communication layers. The fault detection for each communication layer is preferably performed concurrently; however, the fault detection for each communication layer may be performed sequentially. After fault detection is performed on each of the communication layers, the routine proceeds to step 52.

In step 52, fault detection analysis is performed on an integrated ECU node level. For each ECU, the diagnostic data obtained from the analysis of each of the communication layers are collectively analyzed at the ECU node level. This involves the integrated diagnostics and prognosis of fault detection data at the multiple communication layers.

In step 53, network level fault detection analysis is performed on the communication bus. The network level fault detection analysis may be performed concurrently with node level analysis and/or integrated node level analysis. Alternatively, network level fault detection analysis may be performed sequentially, either before or after the node level analysis or integrated node level analysis. This includes monitoring and detecting faults of the communication bus.

In step 54 integrated network level diagnostics and prognosis are performed utilizing the data obtained in steps 51-53. The diagnostic and prognosis utilizes the ECU node level diagnostic and prognosis data, the integrated node level diagnostic and prognosis data, and the network level communication bus fault detection data for collectively analyzing the in-vehicle communication system and isolating the faults within the system.

In step 55, isolated faults are output for identifying the faults. The identified faults may be immediately output to a user such as a driver of a vehicle or a service technician servicing the vehicle. Alternatively, the identified faults may be stored in memory for later retrieval by a service technician or other entity by an engineering group for correcting and enhancing the in-vehicle communication system. In addition, the isolated faults may be used to perform prognosis of intermittent faults within the in-vehicle communication system.

While certain embodiments of the present invention have been described in detail, those familiar with the art to which this invention relates will recognize various alternative designs and embodiments for practicing the invention as defined by the following claims.

What is claimed is:

1. A method of diagnosing a fault in an in-vehicle communication system, the in-vehicle communication system including a transmitting node, at least one receiving node, and a network communication bus coupling the transmitting node to the at least one receiving node, each of the transmitting node and the at least one receiving node including a plurality of communication layers for servicing messages within each of the nodes within the in-vehicle communication system, the plurality of communication layers of each node including at least an application layer, an interaction layer, a data link layer, and a physical layer, the method comprising the steps of:
 transmitting a message from the transmitting node to the at least one receiving node over the communication bus;
 applying a fault detection technique within the transmitting node for detecting a fault within the transmitting node;
 applying a fault detection technique within the at least one receiving node for detecting a fault within the at least one receiving node;
 applying a fault detection technique within the network communication bus for detecting a fault within the communication bus; and
 an analyzer collectively analyzing results from each respective detection technique for isolating a fault within the in-vehicle communication system.

2. The method of claim 1 wherein applying a fault detection technique to the transmitting node includes applying a respective fault detection technique to each communication layer within the transmitting node.

3. The method of claim 2 wherein each of the fault detection techniques applied in the transmitting node are collectively analyzed for diagnosing and isolating a location of the fault within the transmitting node.

4. The method of claim 3 wherein applying a fault detection technique to the at least one receiving node includes applying a respective fault detection technique to each communication layer within the at least one receiving node.

5. The method of claim 4 wherein each of the fault detection techniques applied in the at least one receiving node are collectively analyzed for diagnosing and isolating a location of the fault within the receiving node.

6. The method of claim 5 wherein an integrated diagnostic technique is collectively applied to the in-vehicle communication system, the integrated diagnostic technique performs integrated diagnostic analysis on the collective analyzed diagnostics of the at least one receiving node, the collective analyzed diagnostics of the transmitting node, and the fault detection analysis of the communication bus.

7. The method of claim 6 wherein the analyzed diagnostics of each node are reported to a network level diagnostic module, wherein the integrated diagnostic technique is performed by the network level diagnostic module.

8. The method of claim 7 wherein a prognosis analysis is performed by the network level diagnostic module on the identified isolated fault for determining intermittent faults within the in-vehicle communication system.

9. The method of claim 1 wherein identifying the fault includes identifying a software fault within a respective node.

10. The method of claim 1 wherein identifying the fault includes identifying a hardware fault within a respective node.

11. The method of claim 10 wherein identifying the fault includes identifying a controller fault within a respective node.

12. The method of claim 10 wherein identifying the fault includes identifying a transceiver fault within a respective node.

13. The method of claim 10 wherein identifying the fault includes identifying a bus connector fault within a respective node.

14. The method of claim 1 wherein identifying the fault includes identifying a disconnection of a wire within the communication bus.

15. The method of claim 1 wherein identifying the fault includes identifying a short between a wire and a ground within the communication bus.

16. The method of claim 1 wherein the identified fault is output utilizing an output device for identifying the fault.

17. The method of claim 1 wherein the identified fault is stored in a memory storage device.

18. The method of claim 1 wherein analyzer is comprised of a centralized node dedicated to collectively analyzing the results of each respective detection technique for isolating the fault.

19. The method of claim 1 wherein the analyzer is comprised of resources across the plurality of nodes in the in-vehicle communication system.

20. The method of claim 19 wherein resources include a controller in each node dedicated to collectively analyzing the results of each respective detection technique, the controller in each node collectively communicates with one another until a consensus is achieved among the communicating ECUs for identifying the fault.

* * * * *